Sept. 3, 1940.  T. DANIELS  2,213,902
MANUFACTURE OF CHOCOLATE COATED SWEETMEATS
Filed July 27, 1939
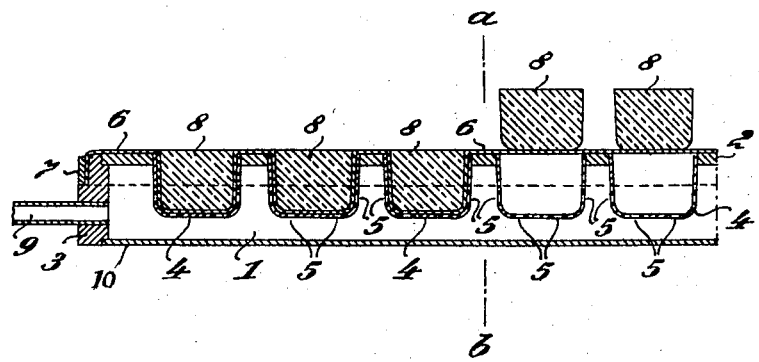
Inventor
Theodor Daniels
By
Attorney Patented Sept. 3, 1940

2,213,902

UNITED STATES PATENT OFFICE 2,213,902

MANUFACTURE OF CHOCOLATE COATED SWEETMEATS

Theodor Daniels, Wevelinghoven, Rhineland, Germany

Application July 27, 1939, Serial No. 286,899
In Germany July 23, 1937

1 Claim. (Cl. 107—19)

The invention relates to the manufacture of cream, nougat, jelly or like centers or bodies for use in the manufacture of chocolate coated sweetmeats, for example, chocolate creams, pralines or the like, and to moulds for use in such manufacture.

Hitherto the cream centers or bodies have been cast in so called powder boxes, that is, powder is inserted in a box or mould, the powder is pressed in the box by a punch or moulding ram and the fluid mass of cream or other material which is to constitute the body is cast into the powder matrix so formed. The powder boxes are then passed into heated chambers in which they remain for about twelve hours for the purpose of hardening the cream. Since a great deal of powder adheres to the mass of cream, the cream elements must then be freed from powder before they can be coated with chocolate in known manner. The manufacture of cream or like centers or bodies is, therefore, very complicated and incurs the expenditure of a great deal of time. A further disadvantage is that the bodies being cast in powder are not uniform in shape and size since the powder is readily movable and the impressions of the moulding ram frequently vary. This leads to great difficulties in coating the final products with tin foil, many being squashed owing to be oversized. Further, too much moisture is abstracted by the powder from the cream mass in the heated chamber so that it becomes too hard and has no longer the plasticity which the finished bodies should have. Further the manufacture of jelly centers or bodies with the aid of powder boxes necessitates washing of the jelly bodies after removal from the powder boxes since a great deal of powder adheres to them.

The manufacture of nougat centers or bodies is still more difficult since up to the present, the nougat must be cast in slabs which are then divided up into smaller portions of the desired shape and size. Nougat centers or bodies up till now could not be manufactured in ornamental form.

All the above described disadvantages of the known methods for manufacturing cream, nougat and jelly centers or bodies are overcome by the invention which consists in casting the cream, nougat or jelly into moulds, over the perforated depressions of which is stretched a skin of rubber or the like, the skin having been previously sucked into the mould depressions tightly against their finely perforated inner walls by extracting the air contained in these depressions. The cream mass is then brought to a semi-solid condition by cooling, e. g., in a cooling chamber which can be effected in a few minutes, after which the centers or bodies are raised out of the moulds by letting air in under the rubber skin or the like. They may then be coated with chocolate in the usual manner. The use of powder, which incurs, in addition to the disadvantages above described, the development of a great deal of dust and soiling of the work rooms and implements, is thus wholly dispensed with. Consequently, no powder adheres to the cream, nougat and jelly elements. These elements also retain their moisture and for this reason are softer and more plastic; in addition, the pleasant taste of the centers or bodies is enhanced.

Further, since the stay of about twelve hours in the heated chambers is avoided and the cream, nougat or jelly centers or bodies assume after a few minutes a semi-solid condition in which they can be coated with chocolate, the working operations are substantially shortened. Finally, since the finished cream, nougat and jelly bodies are raised by the stretched rubber or like skin out of the moulds, they can be delivered much faster and more carefully to the coating machine.

In the accompanying drawing, a portion of one form of mould according to the invention is illustrated in side sectional elevation.

The mould illustrated in this drawing comprises a box 1 having a cover or mould plate 2, a plain sheet metal bottom 10 and a surrounding frame 3 constituting the sides of the box.

The mould plate 2 has a plurality of individual moulds or depressions 4 for the centers or bodies. The moulds 4 depend in the interior of the box 1. Each individual mould 4 is provided in its lower part with fine perforations 5.

A skin 6 of rubber or the like is stretched over the mould plate 2 and clamped to the frame 3 by means of a band 7.

An air tube 9 is fitted to the box 1.

The air tube 9 is connected to any suitable suction device so that air can be sucked out of the box 1 and the stretched skin 6 is thereupon pressed by the external air into close contact with the interior surfaces of the perforated individual moulds 4.

By this means depressions are formed in the stretched rubber skin corresponding in shape and size to the individual moulds 4 and these cavities are filled with the fluid cream, nougat or jelly as indicated at 8 to the left of the line a—b.

The filled mould is then passed to a cooling chamber, the vacuum or low pressure in the box being maintained. In a few minutes, the cream, nougat or jelly is brought to a semi-solid condition and the semi-solid bodies 8 so formed are then ejected by allowing air to enter the box 1 through the pipe 9 so that the skin 6 contracts and raises the bodies 9 out of the individual moulds 4, as indicated at the right hand side of the line a—b.

The bodies 8 so ejected may then be coated with chocolate in the manner well known in the art.

While the invention includes a single perforated mould provided with a rubber or like skin and means for removing air from the mould and readmitting it as hereinbefore described, it will be obvious that a mould having a plurality of individual moulds as hereinbefore described is preferable for rapid operation.

I claim:

A moulding apparatus including a hollow body closed at the top, bottom and ends, a series of moulds carried by the top and extending into the hollow body, the moulds being spaced apart and of less depth than the corresponding dimension of the body, the bottom of the moulds within the body being perforated, a flexible expansible element terminally secured to the ends of the body, and overlying the upper open ends of the moulds, and means opening through one end of the body whereby the interior of the body and of the moulds may be subjected to suction to draw the element into and in exact conformity with the interior of the moulds.

THEODOR DANIELS.